United States Patent [19]
Green

[11] Patent Number: 6,047,746
[45] Date of Patent: Apr. 11, 2000

[54] GRANULAR DISPENSING SYSTEM

[76] Inventor: Scott Green, 7709 Georgia Rd., Birmingham, Ala. 35212

[21] Appl. No.: 09/131,994

[22] Filed: Aug. 11, 1998

[51] Int. Cl.⁷ ........................................................ B65B 1/04
[52] U.S. Cl. .................................. 141/103; 141/2; 141/9; 141/100; 141/104; 141/250; 141/255; 222/361; 222/531
[58] Field of Search ........................ 141/2, 9, 100–107, 141/247–250, 255, 280, 284; 222/361, 364, 531

[56] References Cited

U.S. PATENT DOCUMENTS

| | | | |
|---|---|---|---|
| 780,680 | 1/1905 | Peterson et al. ........................ | 222/361 |
| 1,306,447 | 6/1919 | Stepanoff .............................. | 141/248 |
| 5,651,401 | 7/1997 | Cados ..................................... | 141/129 |

*Primary Examiner*—Henry J. Recla
*Assistant Examiner*—Timothy L. Maust
*Attorney, Agent, or Firm*—Robert J. Veal; Kenneth M. Bush; Veal & Bush, LLC

[57] ABSTRACT

A sand art machine uses a plurality of storage bins for colored granular material, each bin having a discharge orifice and an metering valve connected to the orifice for each bin. The metering valve is connected at a dispensing station above a screen on which a receptacle is positioned such that stray sand passes through the screen into a reclaim hopper from which it can be returned to the supply bin. By using a plurality of variously colored sands a decorative art form in a transparent receptacle is easily fashioned and saved.

16 Claims, 3 Drawing Sheets

GRANULAR DISPENSING SYSTEM

FIELD OF THE INVENTION

The present invention relates to the field of amusement devices and more particularly to those devices wherein an operator operates the device such that a colored product is created by the interaction of the operator and the apparatus. More particularly, the present invention may be considered a novelty art apparatus wherein the artist works with the medium of sand or like granular material such that the sand is dispensed into a transparent dispenser, such as a bottle. In even greater particularity, the present invention provides a measuring and dispensing system which will allow children and adults to measure incremental quantities of colored granular material for dispensing into a transparent container.

BACKGROUND OF THE INVENTION

Sand art in bottles is not new; however, the use of sand art in bottles has traditionally been the province of artists or others who have an area in which the excess or lost sand will not become a nuisance. When such areas are found in public places, sandart as a form of entertainment has been limited to particular environments which have been easily cleaned and out of the way of the flow of mainstream traffic. Sand art is typically seen in carnival environments or arts and crafts fairs (rainbow sand) and have open buckets, numerous colors, scoops and funnels. For example, the use of hand held funnels and scoops to pour colored sand into bottles generally leaves a considerable quantity of sand on the floor or table around the bottle and generally requires close adult supervision for small children.

Accordingly, the use of sand art as a recreational art form for children and adults has had limited application in the general marketplace. A need exists for a means to use inexpensive sand as an art medium for children.

SUMMARY OF THE INVENTION

It is an object of the present invention to provide an easy, clean and compact means for using sand as an art form which can be adapted to any number of public recreational venues.

Another object of the invention is to provide a sand art machine which is child user friendly and does not require substantial adult supervision.

Yet another object of the invention is to provide a sand art machine which requires minimal cleanup and can recycle sand for reuse when spilled by youthful users.

These and other objects of the invention are accomplished by the use of a plurality of storage bins for the granular material, a discharge orifice and an metering valve connected to the orifice for each bin. The metering valve is connected at a dispensing station above a screen on which a receptacle is positioned such that stray sand passes through the screen into a reclaim hopper from which it can be returned to the supply bin. By using a plurality of variously colored sands, a decorative art form in a transparent receptacle is easily fashioned and saved.

BRIEF DESCRIPTION OF THE DRAWINGS

Apparatus embodying features of my invention are depicted in the accompanying drawings which form a portion of this disclosure and wherein.

DESCRIPTION OF THE PREFERRED EMBODIMENT

Figure 1:
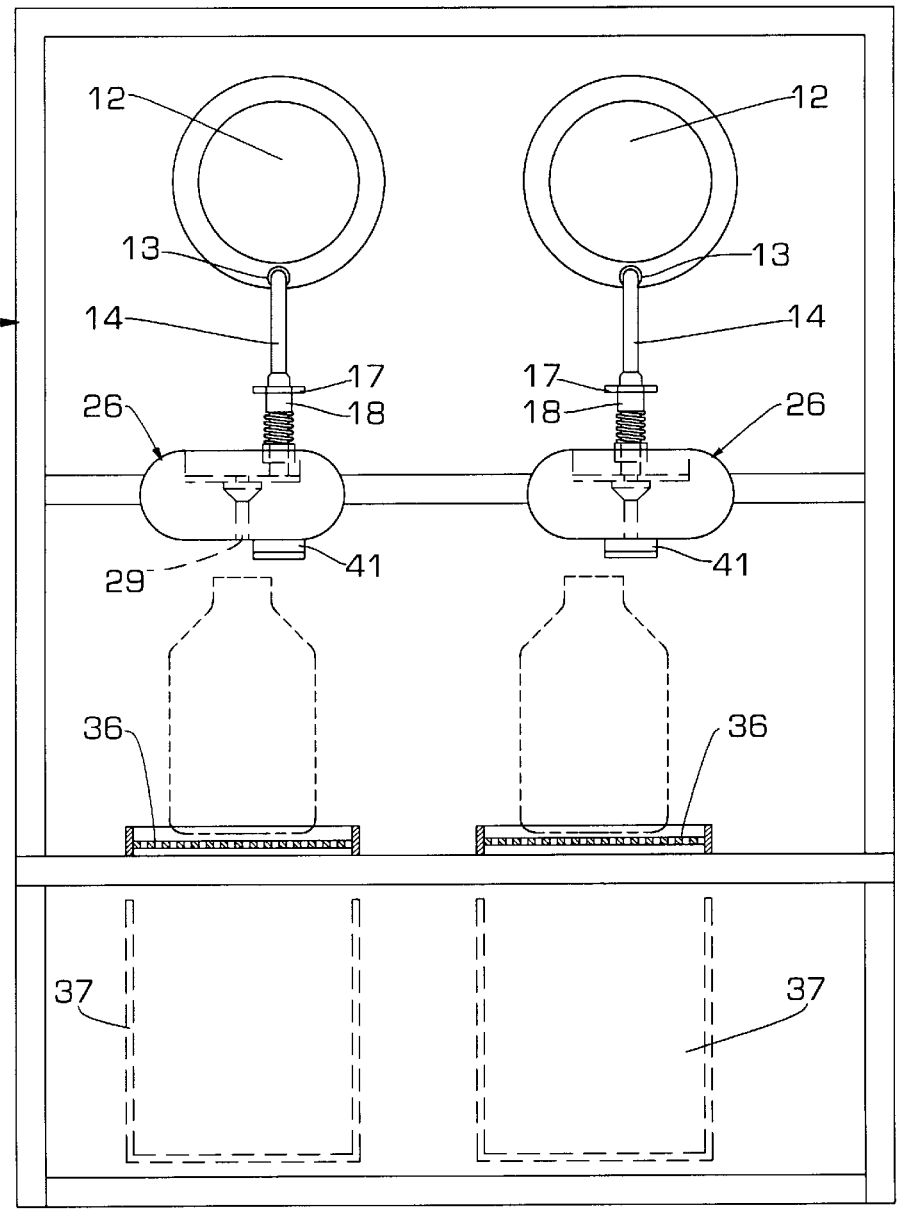
FIG. 1 is a frontal elevational view of a two bin dispensing system.

Referring to the figures for a better understanding of the invention it may be seen in FIG. 1 that the apparatus comprises a generally upright frame 10 on which are supported a plurality of bins 12 for storing granular material such as sand of various colors in segregated compartments. Each bin 12 has an outlet 13 which may be connected to a conduit 14 of transparent material such that sand flows from bin 12 into conduit 14 under the force of gravity. Each conduit 14 terminates at a lower entrant portion seen more clearly in FIGS. 2 through 4.

Figure 2:
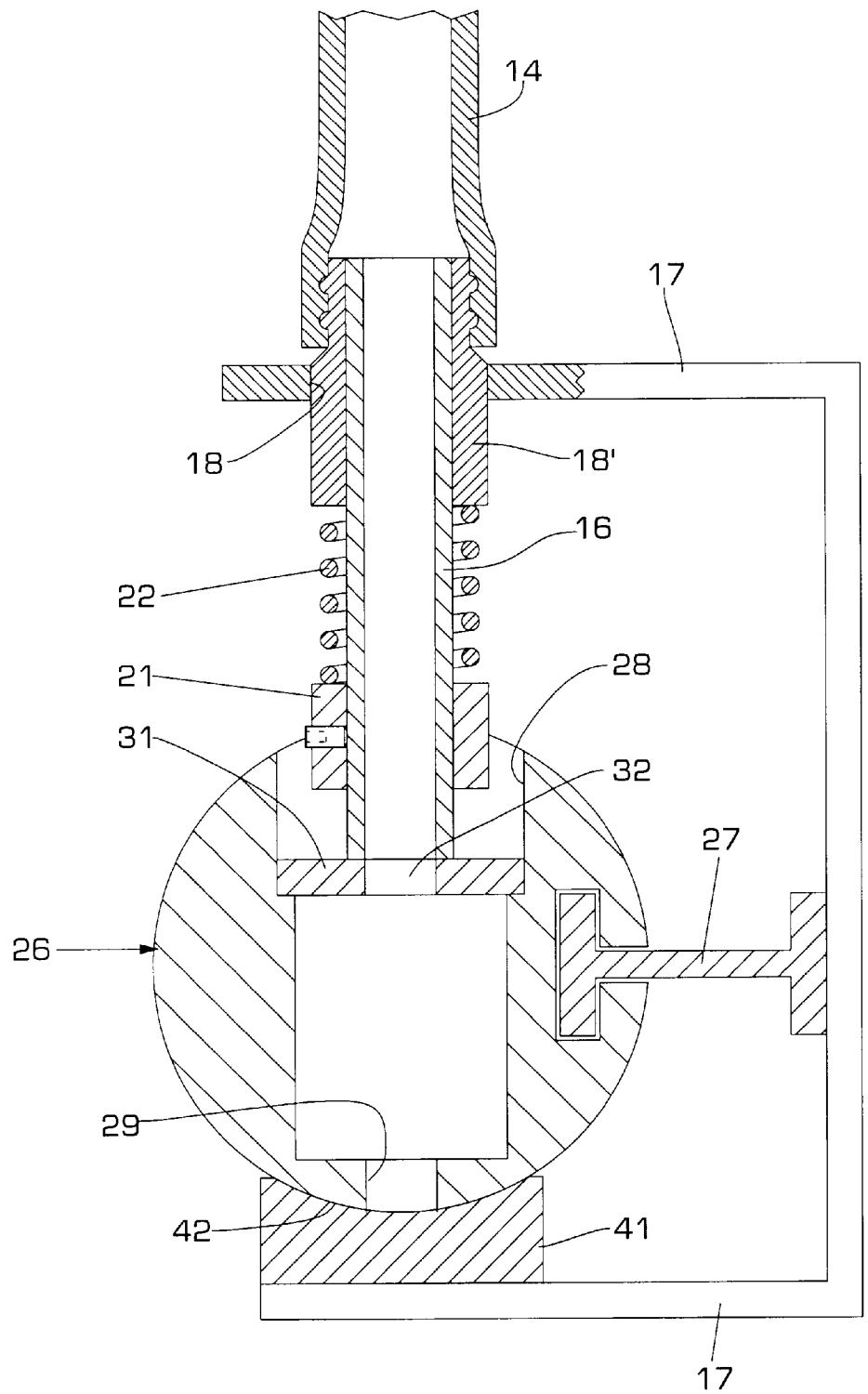
FIG. 2 is a sectional view through the valve body transverse to the direction of motion of the valve body.

In FIG. 2 it may be seen that conduit 14 is secured proximal entrant portion 16 by bracket 17 mounted to frame 10, not shown. Bracket 17 has an aperture 18 in which a brass fitting 18' is threaded. Fitting 18' has a barbed extension thereon for recieveing conduit and connect to a dispensing conduit 14. Optionally this conduit may be biased downwardly by spring 22 coaxially mounted thereabout and captured between boss 21 and bracket 17. A transparent slide block 26 is mounted on a T-slide 27 also affixed to bracket 17 or otherwise affixed to frame 10 such that the slide block may move laterally beneath the conduit 14. An upper recess 28 is formed in the top of the slide block and a vertical bore 29 is formed from the recess through the slide block 26. The bore includes an upper funnel shaped portion. A slide plate 31 overlies the bottom of recess 28 and provides a bearing surface for entrant portion 16. A metering aperture 32 is formed in plate 31 coaxially above bore 29.

Figure 3:
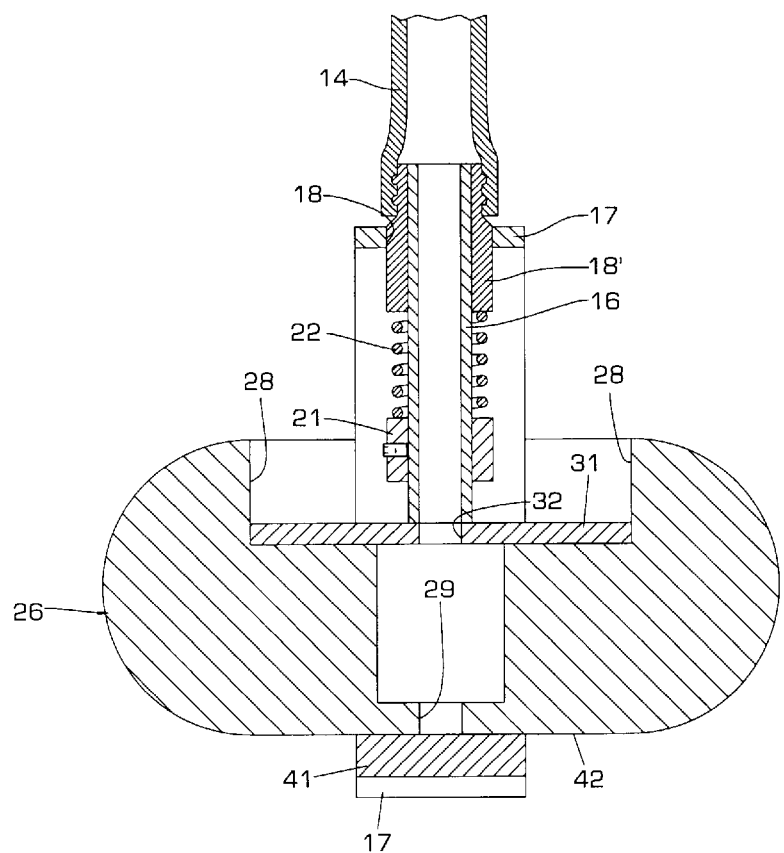
FIG. 3 is a sectional view transverse to the view in FIG. 2 with the valve in a closed position; and, FIG. 4 is a sectional view as in FIG. 3, with the valve in a dispensing position.
Figure 4:
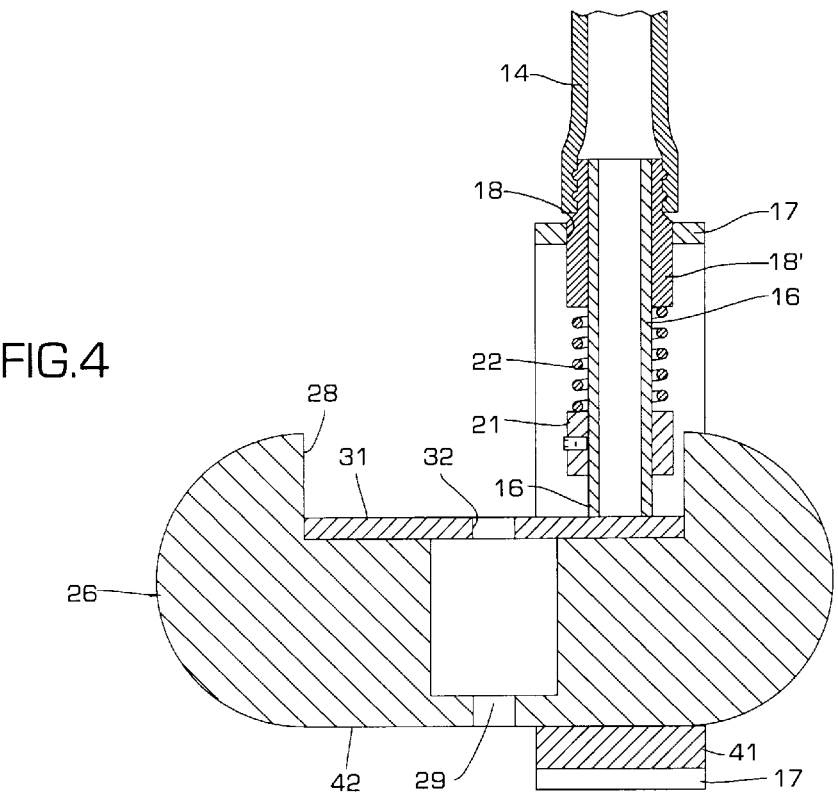

Bracket 17 also supports a stop 41 which in turn slidingly supports slide block 26 for transverse movement. Stop 41 conforms to the lower surface 42 of slide block 26 and thus seals bore 29 at its lower end when the slide block is in its "closed" position. At this position entrant portion 16 is aligned with metering aperture 32 such that vertical bore 29 is filled with sand by gravity as shown in FIG. 3. In FIG. 4 slide block 26 is moved to the open position, such that entrant portion 16 is closed by plate 31 and bore 29 is open to discharge its quantity of sand into a subjacent receptacle.

The receptacles are supported on a wire or screen platform 36 mounted beneath the slide member such that any stray sand which is not introduced into the receptacle falls through the screen and is collected in a bucket 37 or similar container such that the sand may be returned to the bin for later use. It will be appreciated that each station will have only one color sand; thus, in normal practice the contents of each bucket may be sifted to remove foreign matter and then returned to the bin without degrading the color quality of the sand. It should also be understood that while the drawings only show two stations, as many stations as may be desired may be utilized to increase the number of colors (including rainbow or mixed color sand) as well as the number of simultaneous participants.

It is anticipated that the above apparatus will be used in amusement parks, on board cruise ships, and in any other venue wherein children are likely to require entertainment and a souvenir. The present device offers both. To enhance the appeal the frame may be covered with an attractive decorative housing and may have lighting or sound enhancements added to be employed to attract the attention of the children expected to use it.

While I have shown my invention in a single embodiment, it is to be understood that it is not so limited and should be interpreted to encompass all of the subject matter as defined within the scope of the appended claims.

What I claim is:

1. Apparatus for dispensing a flowable granular material into a container for use as an art form, comprising:

means for confining a supply of flowable granular material for selective discharge;

means for controlling the release of said flowable granular material into the container, wherein said means for controlling the release of said flowable granular material includes:

a slide member mounted for horizontal movement between a closed position and an open position, said slide member having a bore therethrough, wherein said slide member comprises a transparent unit having a recess formed on an upper portion thereof, said bore extending from said recess through said transparent unit; and an entrant tube having a lower discharge opening and extending vertically above said slide member and slidingly abutting said slide member such that said discharge opening is closed by said slide member when said slide member is displaced from said closed position, said entrant tube terminating within said recess of said transparent unit; and means for connecting said entrant tube to said confining means for providing a constant supply of said flowable granular material.

2. Apparatus as described in claim 1 wherein said means for controlling the release of said flowable granular material further comprises a stop member mounted beneath said slide member in sliding abutting relationship such that said stop member seals a lower end of said bore when said slide member is in said closed position.

3. Apparatus as described in claim 1, wherein said means for confining is located a distance above said means for controlling such that said flowable granular material is supplied to said means for connecting by a gravity flow.

4. Apparatus as defined in claim 1 further comprising a slide plate positioned in said recess beneath said entrant tube and having a metering orifice therein coaxially aligned above said bore.

5. Apparatus as defined in claim 1 further comprising a frame supporting said confining means and said controlling means and having a plurality of stations thereon at which the transparent container may be positioned beneath said slide member for receiving an amount of flowable granular material carried within said bore as said slide member is moved from said closed position to said open position.

6. Apparatus as defined in claim 1 wherein said flowable granular material is colored sand.

7. Apparatus as defined in claim 1 further comprising a plurality of collection chambers positioned beneath said slide members for collecting sand from said slide members for return to said confining means.

8. Apparatus for dispensing granular material into a transparent container for use as an art form, comprising:

means for confining at least two discrete volumes of a granular material for selective discharge;

means for controlling the release of said granular material into predetermined incremental amounts for discharge into the transparent container, wherein said means for controlling the release of said granular material includes:

a slide member mounted for horizontal movement between a closed position and an open position, said slide member having a bore therethrough;

a stop member mounted beneath said slide member in sliding abutting relationship such that said stop member seals a lower end of said bore when said slide member is in said closed position; and, an entrant tube having a lower discharge opening and extending vertically above said slide member and slidingly abutting said slide member such that said discharge opening is closed by said slide member when said slide member is displaced from said closed position; and, means for connecting said entrant tube to said confining means for providing a constant supply of said granular material;

wherein said slide member comprises a transparent unit having a recess formed on an upper portion thereof, said bore extending from said recess through said transparent unit and said entrant tube terminating within said recess.

9. Apparatus as defined in claim 8 wherein said connecting means comprises a length of transparent conduit material connecting said confining means to said entrant tube such that granular material therein can be viewed by a user of said apparatus.

10. Apparatus as defined in claim 8, wherein said means for confining is located a distance above said means for controlling such that said granular material is supplied to said means for connecting by a gravity flow.

11. Apparatus as defined in claim 8 further comprising a slide plate positioned in said recess beneath said entrant tube and having a metering orifice therein coaxially aligned above said bore.

12. Apparatus as defined in claim 8 further comprising a frame supporting said confining means and said controlling means and having a plurality of stations thereon at which the transparent container may be positioned beneath said slide member for receiving an amount of granular material carried within said bore as said slide member is moved from said closed position to said open position.

13. Apparatus as defined in claim 8 wherein said granular material is colored sand.

14. Apparatus as defined in claim 8 further comprising, a plurality of collection chambers positioned beneath said slide members for collecting sand from said slide members for return to said confining means.

15. Apparatus for filling transparent receptacles with colored sand comprising in combination:

means for supporting the transparent receptacles at a plurality of stations;

means for dispensing discrete quantities of colored sand into the receptacles at any selected one of said plurality of stations said dispensing means including:

a slide member mounted for horizontal movement between a closed position and an open position, said slide member having a bore therethrough;

a stop member mounted beneath said slide member in sliding abutting relationship such that said stop member seals a lower end of said bore when said slide member is in said closed position; and, an entrant tube having a lower discharge opening and extending vertically above said slide member and slidingly abutting said slide member such that said discharge opening is closed by said slide member when said slide member is displaced from said closed position;

means for storing a quantity of sand of various colors for selective dispensing each quantity of sand associated with a selected one of said plurality of stations;

wherein said slide member comprises a transparent unit having a recess formed on an upper portion thereof, said bore extending from said recess through said transparent unit and said entrant tube terminating within said recess.

16. A method for creating sand art in a transparent receptacle comprising the steps of:

a) storing a quantity of a granular material of various colors for selective dispensing;

b) supporting the transparent receptacle at one of a plurality of stations each connected to said quantity of granular material of a particular one of said various colors;

c) dispensing a measured quantity of granular material into the transparent receptacle at selected ones of said stations using a slide member mounted for horizontal movement between a closed position and an open position, said slide member having a bore therethrough, a stop member mounted beneath said slide member in sliding abutting relationship such that said stop member seals a lower end of said bore when said slide member is in said closed position, and an entrant tube in fluid communication with said stored granular material and having a lower discharge opening and extending vertically above said slide member and slidingly abutting said slide member such that said discharge opening is closed by said slide member when said slide member is displaced from said closed position, such that iterative movement of said slide member discharges a quantity of granular material equal to the volume of said bore into the receptacle.

* * * * *